United States Patent [19]

Nagano et al.

[11] Patent Number: 5,069,183
[45] Date of Patent: Dec. 3, 1991

[54] MULTI-CYLINDER ENGINE CONTROL METHOD AND ELECTRONIC CONTROL APPARATUS THEREFOR

[75] Inventors: Masami Nagano; Takeshi Atago; Mamoru Nemoto, all of Katsuta, Japan

[73] Assignees: Hitachi, Ltd., Tokyo; Hitachi Automotive Eng Co., Ltd., Ibaraki, both of Japan

[21] Appl. No.: 420,519

[22] Filed: Oct. 12, 1989

[30] Foreign Application Priority Data

Oct. 17, 1988 [JP] Japan .................. 63-259479

[51] Int. Cl.⁵ .................. F02D 41/04; F02P 5/15
[52] U.S. Cl. .................. 123/419; 73/117.3; 123/425; 123/435; 123/436
[58] Field of Search .................. 123/419, 425, 435, 436, 123/494; 73/116, 117.3

[56] References Cited

U.S. PATENT DOCUMENTS 4,495,920  1/1985  Matsumura et al. ................. 123/436
4,697,561 10/1987  Citron ............................ 123/436 X

FOREIGN PATENT DOCUMENTS

51243  3/1983  Japan ................................. 123/419
 176470 10/1983  Japan .
2075590 11/1981  United Kingdom ................ 123/419

Primary Examiner—Tony M. Argenbright
Attorney, Agent, or Firm—Antonelli, Terry, Stout & Kraus

[57] ABSTRACT

In a multi-cylinder engine control method and a control apparatus therefor, rotating speeds of the multi-cylinder engine at explosion strokes of the respective cylinders are detected for estimating combustion pressures in the respective cylinders, and deviations of the combustion pressures in the cylinders are derived from the estimated combustion pressures in the respective cylinders, so that ignition timings or fuel amounts supplied to the respective cylinders are regulated in response to the derived deviations of the combustion pressures.

7 Claims, 8 Drawing Sheets

| No. 1 | A | I | E | J | A | I | E | J | A | I | E |
| No. 3 | J | A | I | E | J | A | I | E | J | A | I |
| No. 4 | E | J | A | I | E | J | A | I | E | J | A |
| No. 2 | I | E | J | A | I | E | J | A | I | E | J |

MULTI-CYLINDER ENGINE CONTROL METHOD AND ELECTRONIC CONTROL APPARATUS THEREFOR

BACKGROUND OF THE INVENTION

The present invention relates generally to an engine control method and a control apparatus therefor and, more particularly, to a multi-cylinder engine control method and an electronic control apparatus therefor, which enable combustion conditions of the respective cylinders of the multi-cylinder engine to be balanced for producing stable engine power.

Conventionally, as a well-known way of suppressing revolutional fluctuation of an engine especially at the time of idling, for example, it has been disclosed in Japanese Patent Unexamined Publication No. 58-176470, that ignition timings or fuel amounts supplied are corrected to suppress the fluctuation.

In addition, in order to balance combustion conditions of cylinders by equalizing combustion pressures of a multi-cylinder engine, various methods have been attempted. For example, so-called combustion pressure sensors are provided in the respectively cylinders so that the combustion pressures will be directly detected to effect the engine control.

However, in these conventional methods, especially in the former, after numbers of revolutions representing the engine power are detected, the ignition timings or the like of the cylinders at the succeeding procedures are suitably regulated in response to the fluctuation, so that the revolutional fluctuation is controlled to suppress vibration to some extent, but it has been almost impossible in principle to sufficiently suppress revolutional vibration caused by output unbalance of the respective cylinders of the engine, thereby resulting in discomfort to drivers or passengers who suffer from delicate vibration transmited from the vehicle body, the steering or the like.

Besides, in the latter of the above-stated conventional methods, the respective cylinders have to be provided with sensors for detecting each of the combustion pressures, which inevitably causes the cost of the control apparatus to increase, and such sensors for detecting the combustion pressures do not have enough durability, so that they have not been put into practice yet.

SUMMARY OF THE INVENTION

Thus, taking the problems of the conventional methods described above into consideration, an object of the present invention is to provide a multi-cylinder engine control method and its electronic control apparatus, by which combustion pressures of the respective cylinders of the multi-cylinder engine can be equalized so as to stabilize engine power without directly detecting the combustion pressures in the engine cylinders.

The object of the present invention can be first achieved by a multi-cylinder engine control method which has such a characteristic that rotating speeds of the multi-cylinder engine at the explosion strokes of respective cylinders are detected for estimating combustion pressures in the respective cylinders, and that deviations of the combustion pressures in the cylinders are derived from estimated combustion pressures in the respective cylinders, so that ignition timings or fuel amounts supplied to the respective cylinders are regulated in response to the derived deviations of the combustion pressures.

This object can be also achieved by an electronic control apparatus for a multi-cylinder engine, which comprises means for detecting engine running conditions, such means including a rotating speed sensor for detecting the rotating speeds of the multi-cylinder engine and a cylinder discrimination sensor for discriminating the cylinders; electronic control means for producing control signals to determine the ignition timings or the fuel amounts supplied to the respective cylinders in response to outputs from the sensor means; and actuater means for controlling the ignition timings or the fuel amounts supplied to the respective cylinders of the multi-cylinder engine in response to the control signals from the electronic control means. Also the above electronic control means comprises means for estimating the combustion pressures in the respective cylinders of the multi-cylinder engine at the explosion strokes of the respective cylinders from the outputs from the rotating speed sensor and the cylinder discrimination sensor, means for calculating the deviations of the combustion pressures of the cylinders from the estimated combustion pressures in the respective cylinders, and means for regulating the ignition timings or the fuel amounts supplied to the respective cylinders in response to the deviations of the combustion pressures obtained by the calculating means.

The present invention has been accomplished by giving consideration to the fact that the numbers of revolutions of the multi-cylinder engine at the explosion strokes of the respective cylinders represent the combustion pressures in the cylinders. In the multi-cylinder engine control method and its electronic control apparatus according to the present invention, by making use of the combustion pressures in the cylinders which are obtained from the speed of rotation of the multi-cylinder engine at the explosion strokes of the respective cylinders, the ignition timings and the fuel amounts supplied to the respective cylinders are regulated to equalize the combustion pressures in the respective cylinders, so that vibration caused by the balanced combustion conditions of the cylinders can be suppressed to produce stable engine power.

DETAILED DESCRIPTION OF THE PREFERRED EMBODIMENT

Functions of a multi-cylinder engine upon which operational principles of the present invention are based, will be first explained. A relation between mean effective pressure Pi in the respective cylinders in a four-cylinder engine and a rotating speed Ne of the engine at the explosion stroke of respective cylinders, to which the present invention is applied, is shown in FIGS. 2A, 2B, 2C, and 2D. Numerals used in FIGS. 2C and 2D indicate reference numbers of the cylinders. In addition, the rotating speeds Ne are detected at each of top dead centers (TDC).

Figure 2A:
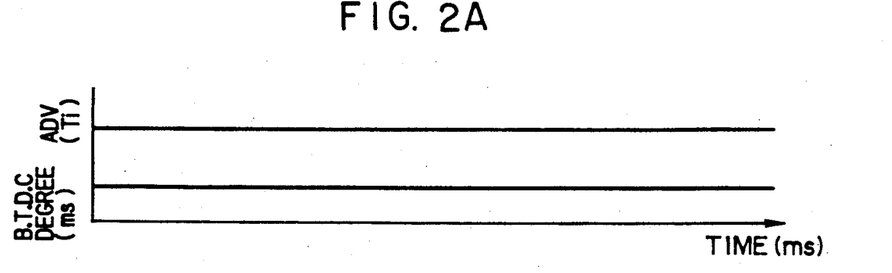
FIGS. 2A, 2B, 2C, and 2D are wave-form charts partially showing relations between the combustion conditions and the rotating speeds the multi-cylinder engine.
Figure 2B:
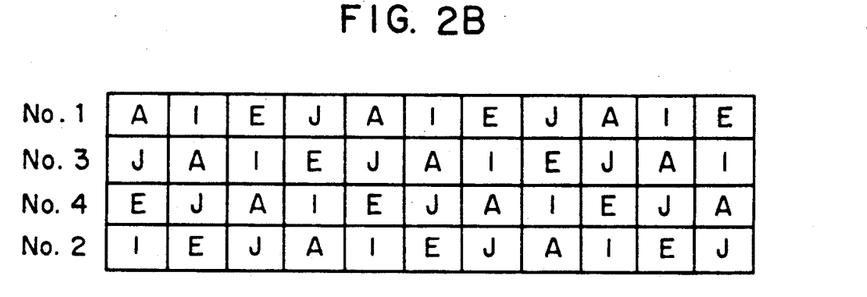
Figure 2C:
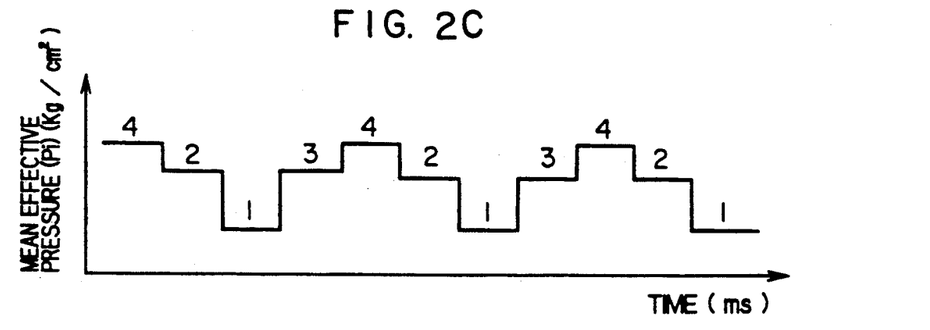
Figure 2D:
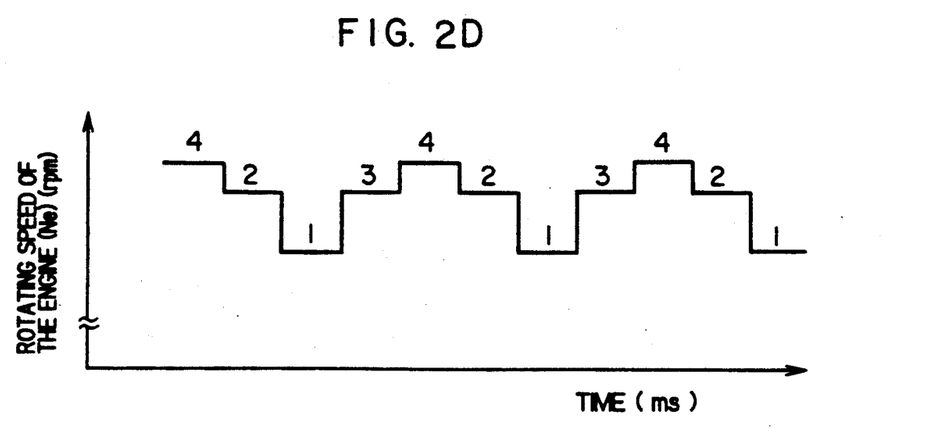

In FIGS. 2C and 2D, the axis of abscissas represents time (ms). In FIG. 2B, the strokes of the respective cylinders change successively, in acccordance with time, in the order of a first cylinder (No. 1), a third cylinder (No. 3), a fourth cylinder (No. 4), and a second cylinder (No. 2). In FIG. 2B, "I" denotes an ignition stroke, "A" an intake stroke, "E" an explosion stroke, and "J" a fuel injection stroke. As clearly seen in FIG. 2C, the mean effective pressures Pi of the respective cylinders are different from one another in each of cylinders. In this example illustrated in the chart, the mean effective pressure Pi is the highest in the fourth cylinder and the lowest in the first cylinder. On the other hand, as in FIG. 2D, the rotating speeds Ne of the engine are different from one another for each of cylinders. In this example, the rotating speed Ne is the highest at an explosion stroke of the fourth cylinder and the lowest at an explosion stroke of the first cylinder. As shown in FIG. 2A, however, these results are obtained when the respective cylinders have an identical fuel injection time Ti and ignition timing. As obviously understood from these facts, the mean effective pressures Pi in the respective cylinders, which directly influence combustion conditions of the engine, are generally different in each of the cylinders, and the mean effective pressure Pi in each cylinder can be estimated by detecting the corresponding rotating speed Ne. Therefore, each of combustion conditions in the cylinders of the multi-cylinder engine can be consequently estimated from the corresponding rotating speed of the engine at an explosion stroke of the cylinders. The apparatus and the method of the present invention can produce stable engine power by detecting the rotating speeds of the multi-cylinder engine at an explosion stroke of respective cylinders, estimating the combustion conditions of the respective cylinders, and controlling the ignition timings or amounts of supplied fuel, so that the respective cylinders have a uniform combustion condition, thereby suppressing vibration caused by unbalanced combustion conditions of the cylinders.

Next, one embodiment of the present invention will be explained in detail.

Figure 3:
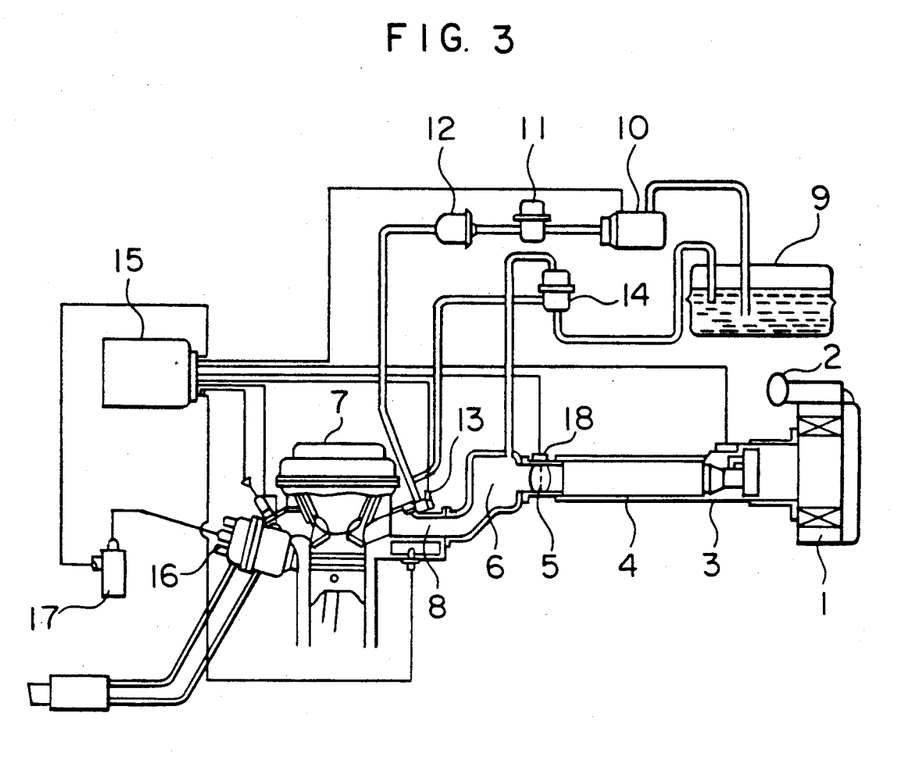
FIG. 3 is a schematic view showing a structure of the above electronic control apparatus of the invention.

First, in FIG. 3, a fuel injection system of a multi-cylinder engine is schematically illustrated. Air introduced from an inlet 2 of an air cleaner 1 passes through a filter of this air cleaner 1 to flow through a hot-wire air flowmeter 3 for detecting an intake amount of air, and further passes through a duct 4 located downstream of the air flowmeter and a throttle body 5 including a restrictor (throttle valve) for regulating the intake air amount, so as to flow into a so-called collector 6. In this collector 6, the intake air is distributed to intake pipes 8 which are connected to the respective cylinders of the multi-cylinder engine 7 and, then, is drawn into the respective cylinders of the engine.

On the other hand, fuel is absorbed from a fuel tank 9 and pressurized by a fuel pump 10. Then, the fuel is directed to fuel inlets of fuel injection valves 13 through a fuel damper 11 and a fuel filter 12. Besides, a small percentage of the fuel directed through the fuel filter 12 to the fuel injection valves 13 is drawn into a fuel pressure regulator 14 and, then, is returned to the fuel tank 9. Owing to the function of this fuel regulator, the pressure of the pressurized fuel supplied to the fuel injection valves 13 is regulated to be constant, and such fuel is injected through the fuel injection valves 13 into the intake pipes 8. In this embodiment, as clearly seen in FIG. 3, the fuel injection valves 13 are attached adjacently to air inlet ports of the cylinders (on the walls of the intake pipes 8) so as to constitute a so-called MPI (multi-point injection) system, in which a plurality of cylinders of a multi-cylinder engine are independently provided with fuel injection valves for controlling amounts of fuel supplied to the respective cylinders. However, the multi-cylinder engine control method and its electronic control apparatus according to the present invention are not necessarily restricted only for this MPI system, and as easily understood from the following explanation, a so-called SPI (single-point injection) system for supplying fuel through a single fuel injection valve to a plurality of cylinders is also applicable if it is able to control the fuel supplied to the respective cylinders.

Further explanation of the present invention is made as follows. An electric signal representing the intake air amount which is output from the air flowmeter 3 is input to a control unit, which will be described in detail below. In addition, the throttle body 5 is provided with a so-called throttle sensor 18 for detecting an opening degree of the throttle valve, and an output signal from this throttle sensor 18 is likewise input to the control unit 15.

Figure 4:
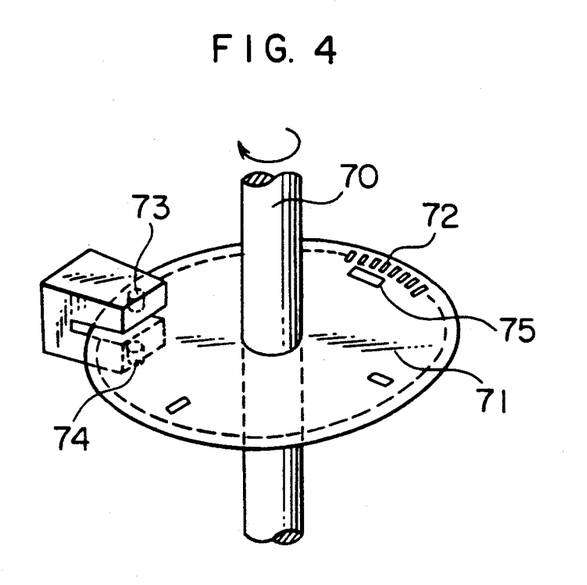
FIG. 4 is a view showing a structure of a crank angle sensor.

A distributor 16 is set adjacently to the engine 7 (on the left side of the engine 7, as seen in the drawing), including therewithin a crank angle sensor for detecting a crank rotation angle of the engine. This crank angle sensor, an example of which is shown in FIG. 4, is so arranged that a metallic disk 71 attached on a crank shaft 70 of the engine 7 is formed with small apertures 72 at intervals of a predetermined angle, and that a light emitting element 73 and a light receiving element 74 are respectively located above and below the metallic disk 71, so as to produce an output signal in proportion with the rotation angle of the crank shaft 70. In addition to the small apertures 72 spaced at intervals of the predetermined angle, the metallic disk 71 of the crank angle sensor is formed with holes 75, whose diameter is larger than that of the small apertures 72, at locations corresponding to predetermined angles of the crank shaft 70, so that the crank angle sensor is arranged to produce a reference position signal for indicating a reference position of the rotation angle as well as the above-mentioned signal for indicating the rotation angle of the crank shaft, these output signals being also input to the control unit 15. Furthermore, a water temperature sensor for detecting a temperature of the engine, an oxygen sensor for detecting an oxygen content of emission gas, and the like are installed, although they are not denoted by reference numerals in FIG. 3. Upon receiving the signals for indicating a running condition of the engine which have been output from the various sensors described above, the control unit 15 operates on these signals in accordance with predetermined computing processes and drives actuaters for suitably controlling the running condition of the engine. For example, as shown in FIG. 3, this control unit 15 outputs control signals to control functions of a power transistor attached to an ignition coil 17, whose connection/disconnection serves to supply/regulate high voltage for ignition to the respective cylinders, functions of the fuel injection valves 13 for injecting/supplying the fuel to the cylinders of the engine 7 and functions of the fuel pump 10.

Figure 5:
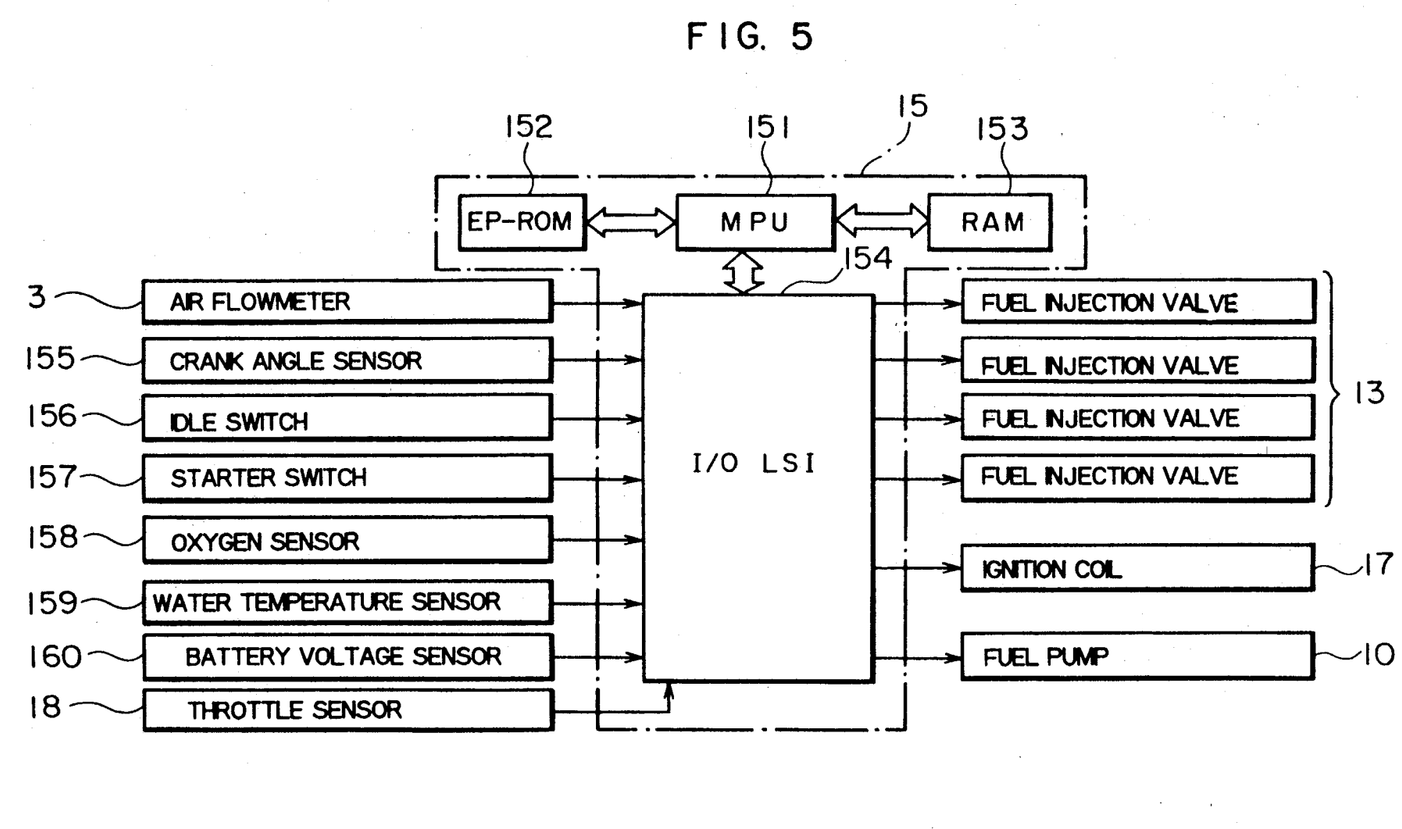
FIG. 5 is a block diagram showing a control unit of the electronic control apparatus.

Next, as illustrated in the chart of FIG. 5, the control unit 15 includes a multi-processor unit (MPU) 151, a rewritable nonvolatile memory (EP-ROM) 152, a random access memory (RAM) 153, an LSI circuit part of I/O LSI 154 serving as an input/output circuit, to which the signals detected by the various sensors for indicating the engine running condition are input, and from which the control signals for driving the actuaters are output or the like. More particularly, the output signals from an air flowmeter 3, a crank angle sensor 155, an idle switch 156, a starter switch 157, an oxygen sensor 158, a water temperature sensor 159, a battery voltage sensor 160, and a throttle sensor 18 are input to the I/O LSI 154 by way of an A-D converter contained within or provided outside this I/O LSI, if necessary. After that, the predetermined computing processes are effected by the MPU 151, the EP-ROM 152, and the RAM 153, and then the operations of the actuaters for controlling the engine such as the fuel injection valves 13, the power transistor of the ignition coil 17, and the fuel pump 10 are controlled.

Details of the operation of the fuel injection system, i.e., the control unit 15 according to the present invention described so far, will be hereinafter explained with reference to a flow chart of FIG. 1.

A routine illustrated below is performed when discrimination of the cylinders is finished. More particularly, the routine is performed at intervals of 180 degrees in the case of a four-cylinder engine. In addition, if the control method in accordance with the present invention is applied to a six-cylinder engine, the routine is performed at intervals of 120 degrees, and if it is further applied to an eight-cylinder engine, the routine is performed at intervals of 90 degrees. Besides, the number of counters CNT for judging suspected values is the same as that of the cylinders, and they are correspondingly assigned to the respective cylinders so as to separately carry out the operation.

Figure 1:
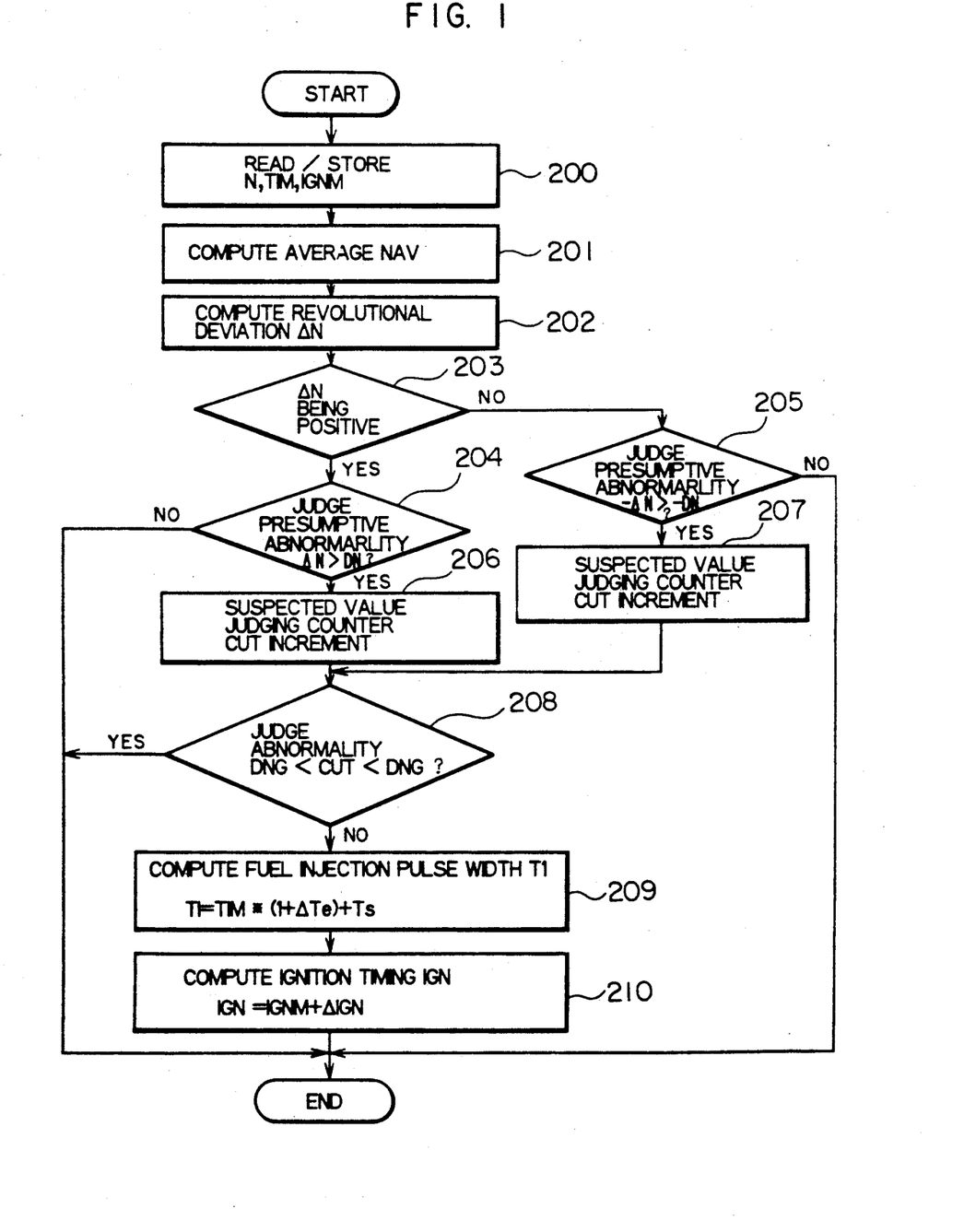
FIG. 1 is a flow chart showing an operation one embodiment of an electronic control apparatus for a multi-cylinder engine according to the present invention.

First, in Step 200 of FIG. 1, a rotating speed N obtained from the output signal from the crank angle sensor 155 and a reference ignition timing IGNM and a reference fuel injection pulse width TIM are read and stored. IGNM and TIM are read from a memory map stored within the ROM on the basis of the rotating speed and the output signal from the air flowmeter 3. After that, in Step 201, by making use of N obtained in Step 200, an average NAV of N is derived from the following formula (1):

$$NAV_n = GAIN*(N - NAV_{n-1}) \ldots \quad (1)$$

wherein $NAV_n$ is a value of NAV at this routine, $NAV_{n-1}$ is a value of NAV at the preceding routine, and GAIN is a damping amount (filter).

Next, Steps 202 and 203 serve to compare the rotating speed N, i.e., the rotating speed of the engine at an explosion stroke of the coresponding cylinder with the average $NAV_n$ of the rotating speed of the engine at explosion strokes of all the cylinders. Thus, in Step 202, a deviation in rotations $\Delta N$ is obtained from the following formula (2):

$$\Delta N = N - NAV_n \ldots \quad (2)$$

In Step 203, this deviation $\Delta N$ is judged to be positive or negative. More particularly, if the rotating speed N in the corresponding cylinder is larger than the average $NAV_n$ and the deviation $\Delta N$ is positive, the process proceeds to Step 204. On the contrary, if the speed N of the corresponding cylinder is smaller than $NAV_n$ and the deviation $\Delta N$ is negative, the process proceeds to Step 205.

First, Step 204 serves to judge a magnitude of cylinder output from the corresponding cylinder according to the deviation $\Delta N$, or particularly to compare this deviation $\Delta N$ with a predetermined value DN. Then, if $\Delta N$ is judged to be smaller than DN ($\Delta N < DN$), the cylinder output from the corresponding cylinder is consequently judged to be normal in comparison with cylinder output from the other cylinders (i.e., average output), and the routine is completed at this step. Although Step 205 is chosen when the deviation $\Delta N$ is negative, its operation is equivalent to that of Step 204.

On the other hand, in Step 204, if $\Delta N$ is judged to be larger than DN ($\Delta N > DN$), or in Step 205, if $-\Delta N$ is judged to be smaller than $-DN$ ($-\Delta N < -DN$), the process proceeds to Step 206 or 207, where the suspected value judging counter CNT exhibits increment (Step 206) or decrement (Step 207). After that, the process proceeds to Step 208, where an absolute value of the suspected value judging counter CNT is judged to be larger or smaller than a predetermined value DNG. Step 208 serves to determine authenticity (reliability) of the suspected value of combustion in the corresponding cylinder which is detected above, and if the absolute value of the counter CNT is larger than DNG, the combustion condition of the cylinder in question is judged to be abnormal, thereby proceeding to Steps 209 and 210. On the contrary, if CNT is smaller than DNG, the suspected value is not clearly judged to be true nor false, and the routine is completed at this step.

Figure 6:
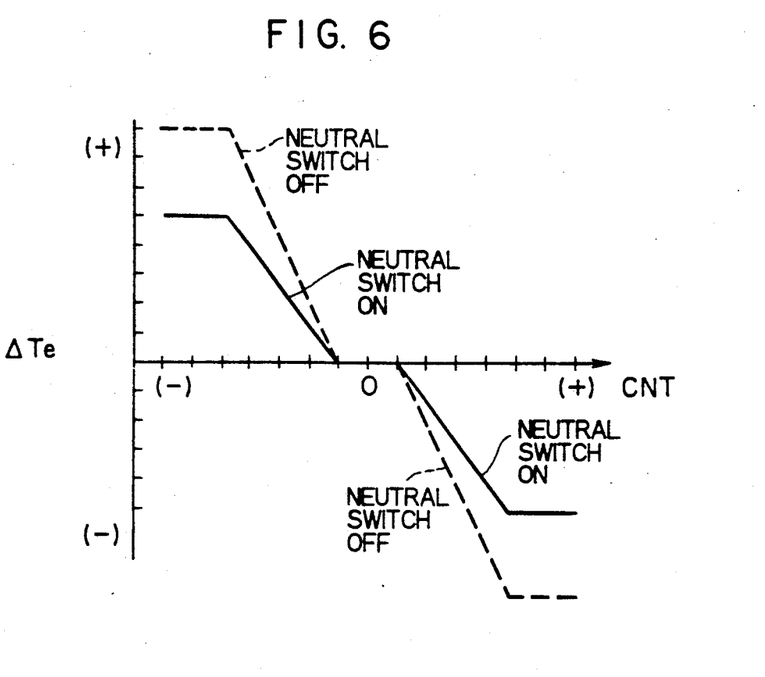
FIGS. 6 and 7 are charts showing relations between counter values for judging suspected values and amounts for correction of fuel injection time and ignition timings in the above electronic control apparatus.

In Step 208 mentioned above, when the combustion condition of the corresponding cylinder is judged to be abnormal, the process proceeds to step 209 as previously described, where the cylinder, of which abnormality of the combustion condition has been detected, is subjected to correction of a ratio of the fuel to be supplied next and the intake air, i.e., A/F ratio, so that the cylinder in question at the next routine is controlled to have the same combustion condition as the other cylinders. More concretely, by utilizing a relationship between a counter value CNT (the axis of abscissas) and an amount for correction $\Delta Te$ (the axis of ordinates) as shown in FIG. 6, $\Delta Te$ corresponding to CNT obtained above is computed. Then, by using $\Delta Te$, a fuel injection pulse width TI of the fuel injection valve 13 is corrected on the basis of the following formula (3):

$$TI = TIM * (1 + \Delta Te) + T_s \ldots \quad (3)$$

where TIM is the reference fuel injection pulse width, and $T_s$ is an invalid pulse width of the injector.

Figure 7:
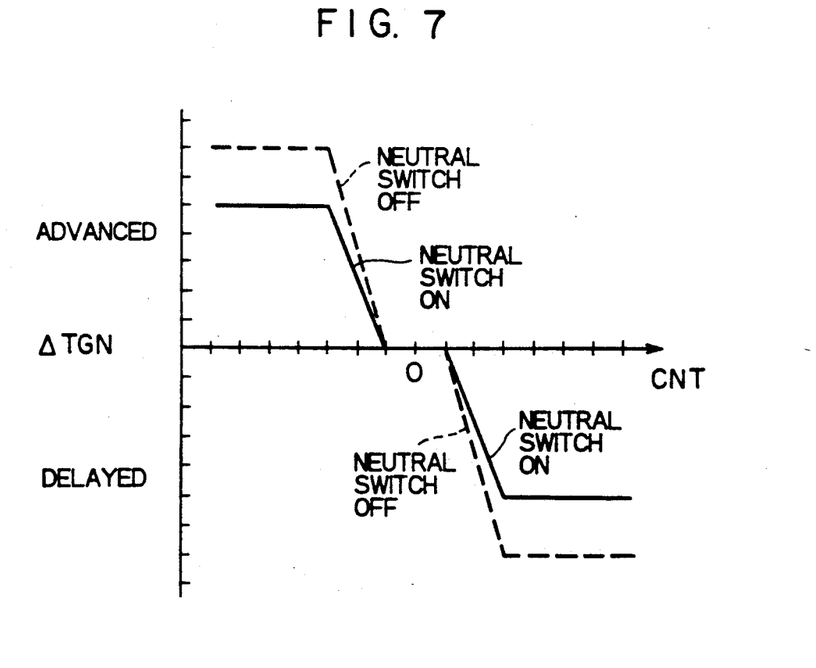

Moreover, in Step 210, correction of the next ignition timing of the corresponding cylinder is performed in the same manner as Step 209 mentioned above. In other words, this correction of the ignition timing is conducted by deriving an ignition timing correction amount $\Delta IGN$ from relationship shown in FIG. 7 according to the counter value CNT described above, so that the ignition timing IGN is determined from the following formula (4) by using this correction amount $\Delta IGN$:

$$IGN = IGNM + \Delta IGN \ldots \quad (4)$$

In this formula, IGNM represents the reference ignition timing.

Figure 8:
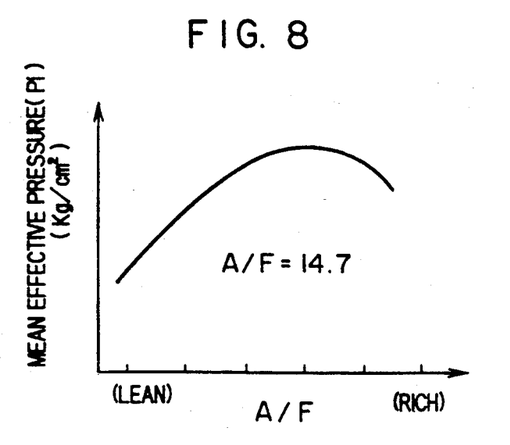
FIGS. 8 and 9 are charts showing relations between mean effective pressures in the engine-cylinders and A/F ratios of fuel supplied to the engine and advance/-delayed amounts of the ignition timings.
Figure 9:
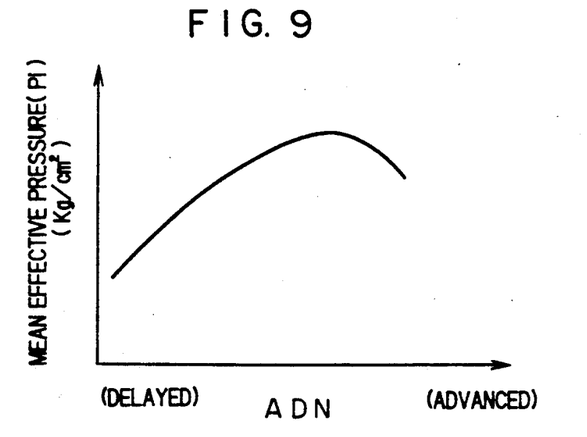
Figure 10:
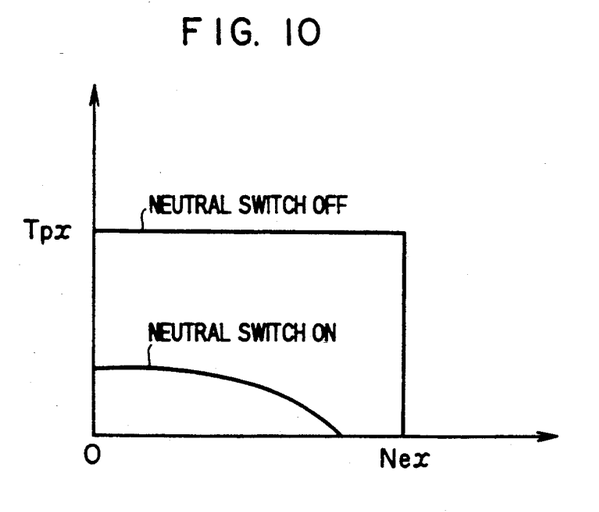
FIG. 10 is a chart showing operational regions to two kinds of characteristic curves in FIGS. 6 and 7.

Furthermore, as illustrated in FIGS. 8 and 9, this correction of the A/F ratio or the ignition timing according to the counter value CNT representing abnormality of the combustion condition is generally carried out in such a manner that the mean effective pressure Pi of each cylinders is decreased by modifying the A/F ratio to be leaner or smaller than an optimum value of 14.7 or by controlling the ignition timing from an advance timing to a delayed timing. That is, according to the present invention, when one of the cylinders exhibits a larger value of the mean effective pressure Pi than those in the other cylinders, the A/F ratio thereof is modified to be smaller, or the ignition timing thereof is delayed, and on the contrary, when one of the cylinders exhibits a smaller value of the mean effective pressure Pi than those in the other cylinders, the A/F ratio thereof is modified to be richer or larger, or the ignition timing thereof is advanced, so that the respective cylinders of the multi-cylinder engine can have uniform output for stabilizing the engine power. In addition, correction of the A/F ratio is explained above as regulating means of the mean effective pressures Pi in the respective cylinders, but this is not the only means, and the same effect can be obviously provided by merely reducing the supplying fuel amount. It is also obvious that both of the ignition timing and the A/F ratio are not necessarily corrected, so that the effect described above can be likewise provided by correcting either the ignition timing or the A/F ratio. Besides, in this embodiment, as shown in FIGS. 6 and 7, the correction amount $\Delta Te$ of the fuel injection time and the correction amount $\Delta IGN$ of the ignition timing are expressed by two sets of lines (one is of solid lines and the other is of dashed lines) corresponding to two divided regions of the engine running condition, i.e., a region of idling where a neutral switch is on and a region of driving where the neutral switch is off, and these values are written in the memories in advance. Such division of the engine running condition is conducted to further increase stability of the engine power in each of the regions. Additionally, FIG. 10 shows the operational regions of the two kinds of characteristic curves illustrated in FIGS. 6 and 7.

Figures 11A, 11B:
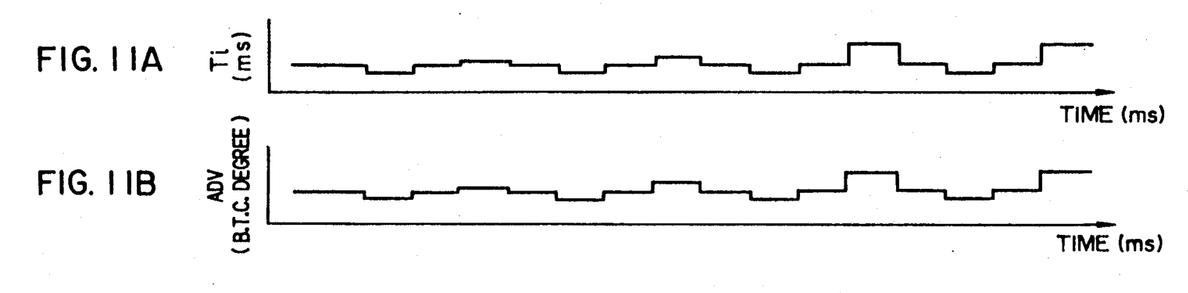
FIGS. 11A, 11B, 11C, 11D, and 11E are charts partially showing wave forms of the respective cylinders of the engine operated by the electronic control apparatus of the present invention.
Figure 11C:
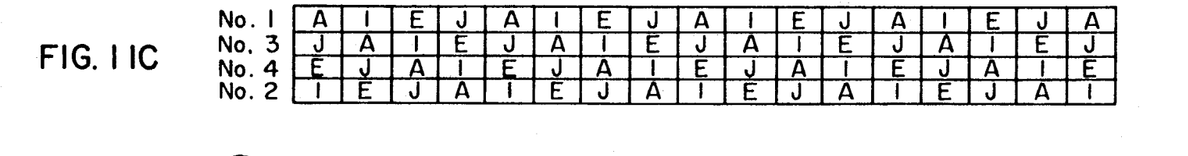
Figure 11D:
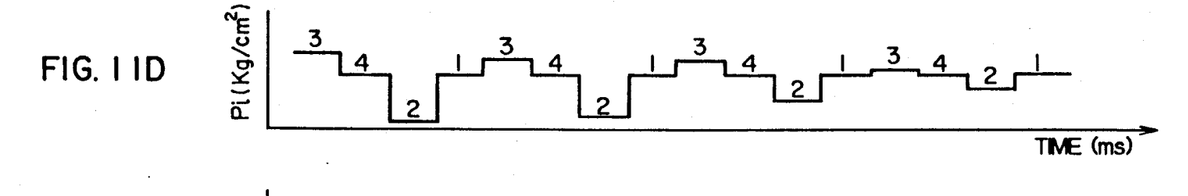
Figure 11E:
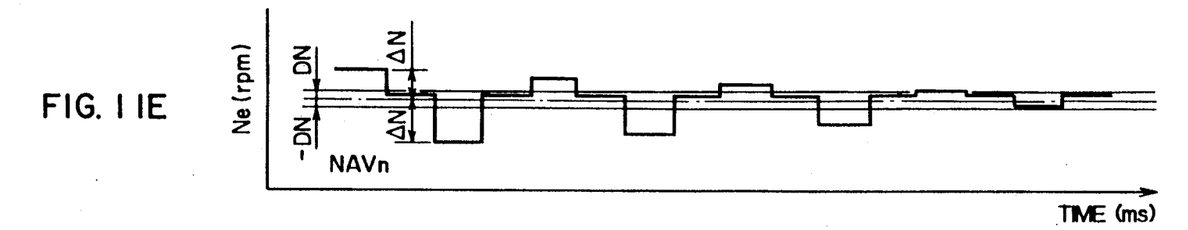
Figure 12A:
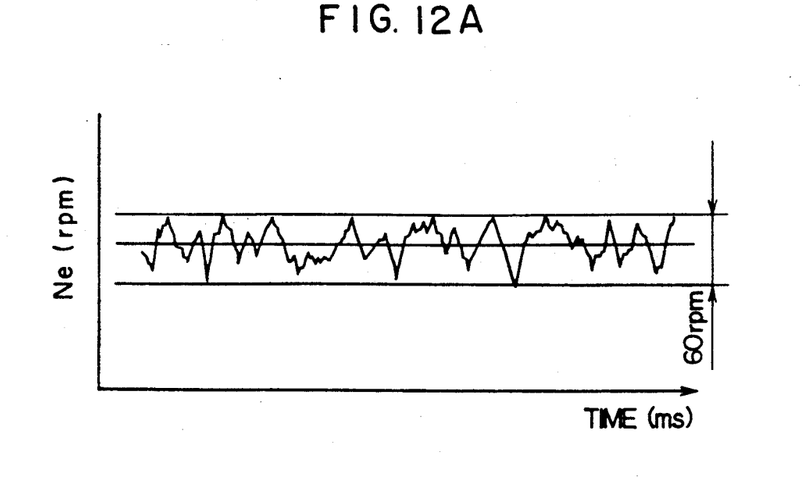
FIGS. 12A and 12B are charts showing results of an actual experiment in a vehicle in comparison with the conventional multi-cylinder-engine.
Figure 12B:
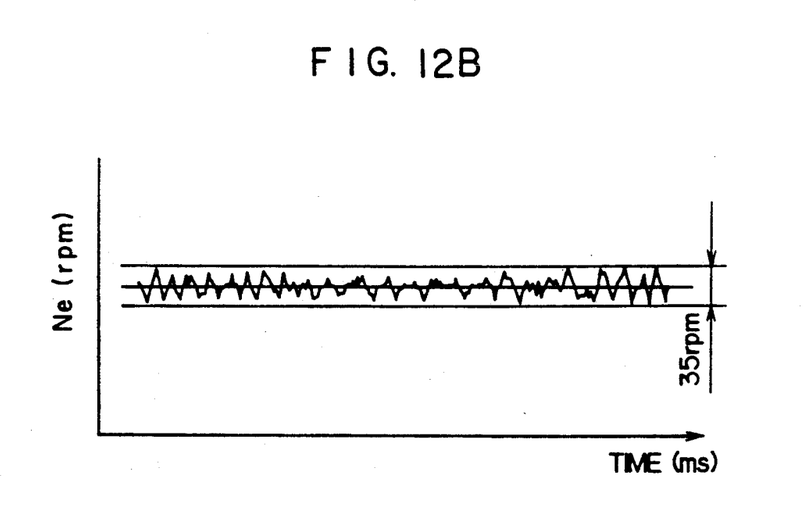

Next, a control method of the present invention described above or control operations by an electronic control apparatus therefor will be explained with reference to FIGS. 11A, 11B, 11C, 11D, and 11E. As clearly understood from these figures, according to the control method or the electronic control apparatus, Ne detected from the respective cylinders are processed to be averaged into the mean value $NAV_n$, and the deviation $\Delta N$ from N at the present routine is calculated (see FIG. 11E). The deviation $\Delta N$ can be also derived by a preset target value in place of the mean value. Then, as previously described, this deviation $\Delta N$ is judged to be larger or smaller than the predetermined value DN, and if it is larger, the combustion condition of the cylinder in question is judged to be abnormal, so that the fuel injection time Ti (i.e., A/F ratio) or an advance amount of ignition timing ADV is regulated to define the rotating speeds Ne of the respective cylinders within a certain range, as illustrated in FIGS. 11A and 11B. In other words, when one of the cylinders has a value of the rotating speed larger than the range, the fuel injection time Ti thereof is reduced, or the advance amount of ignition timing ADV is decreased, and when one of the cylinders has a value of the speed too small in comparison with the other cylinders, the fuel injection time Ti thereof is increased, or the advance amount of ignition timing ADV is increased. By regulating the fuel injection time Ti or the advance amount of ignition timing ADV in this manner, the respective cylinders of the multi-cylinder engine can have the uniform combustion condition, and thus, power unbalance owing to the unbalanced combustion conditions of the cylinders can be decreased for stabilizing the engine power. Further, FIG. 12B shows measurements of fluctuation of output power from a four-cylinder engine actually installed in a vehicle according to the above-described control method of the present invention, where the fluctuation of the rotating speeds Ne is found to be obviously smaller than that of measurements of output power from an engine in a case of the conventional control method which are comparatively shown in FIG. 12A, so that the stabilization of the output power can be fully effected. More concretely, the maximum fluctuation of the measured rotating speeds is 60 rpm in the conventional case of FIG. 12A, but according to the present invention, it can be reduced to 35 rpm, almost half of the conventional value.

In addition, although a case where the control method of the present invention is applied to the entire operational regions of the multi-cylinder engine is explained in the above embodiment, the control method of the present invention can be also very effective for stabilizing the speeds of the cylinders during idling in particular. It is because the engine is influenced by almost no load during idling so that vibration due to the unbalanced output power from the engine cylinders is likely to be felt relatively large, but that the balance of output power of the respective cylinder can be easily obtained by regulating the ignition timing or the supplying fuel.

As clearly understood from the explanation above, the present invention does not particularly require additional sensors so as to be superior in economy, and intends to provide the multi-cylinder engine control method and its electronic control apparatus, by which the unbalanced output power from the respective cylinders of the engine can be regulated to ensure the stable engine power.

What is claimed is:

1. A multi-cylinder engine control method comprising detecting rotating speeds of the multi-cylinder engine at explosion strokes of respective cylinders mounted in said engine for obtaining estimated combustion pressures in said respective cylinders, determining respective deviations of said combustion pressures in said cylinders from said estimated combustion pressures in said cylinders, and regulating at least one of ignition timing and fuel amounts supplied to said respective cylinders in accordance with said deviations of said combustion pressures.

2. A multi-cylinder engine control method according to claim 1, wherein said deviations of said combustion pressures in said respective cylinders are determined by averaging said estimated combustion pressures in said respective cylinders to obtain an average value, and comparing the average value with said estimated combustion pressures in said respective cylinders.

3. A multi-cylinder engine control method according to claim 1, wherein determining deviations of said combustion pressures in said respective cylinders includes comparing said estimated combustion pressures in said respective cylinders with a predetermined value.

4. An electronic control apparatus for a multi-cylinder engine comprising: means for detecting engine running conditions, said means including a rotating speed sensor for detecting rotating speeds of said multi-cylinder engine and a cylinder discrimination sensor for discriminating the cylinders; electronic control means for producing control signals to determined at least one of ignition timings and fuel amounts to be supplied to said respective cylinders in response to outputs from said sensor means; wherein said electronic control means comprises means for estimating combustion pressures in said respective cylinders of said multi-cylinder engine at an explosion stroke from the outputs from said rotating speed sensor and said cylinder discrimination sensor, means for calculating deviations of said combustion pressures in said cylinders from said estimated combustion pressures in said respective cylinders, and means for regulating at least one of said ignition timings and said fuel amounts supplied to said respective cylinders in response to said deviations of said combustion pressures obtained by said calculating means.

5. An electronic control apparatus for a multi-cylinder engine according to claim 4, wherein said electronic control means further includes means for averaging said estimated combustion pressures in said respective cylinders, and said calculating means for calculating said deviations of said combustion pressures in said electronic control means includes comparing means for comparing said combustion pressures in said respective cylinders with the average so as to obtain said deviations.

6. An electronic control apparatus for a multi-cylinder engine according to claim 4, wherein said electronic control means further includes means for producing a predetermined reference value of said combustion pressures, and wherein said calculating means for calculating said deviations of said combustion pressures includes comparing means for comparing said combustion pressures in said respective cylinders with said reference value so as to obtain said deviations.

7. An electronic control apparatus for a multi-cylinder engine according to claim 4, wherein said apparatus further includes means for detecting running conditions of said engine at the time of idling.

* * * * *